United States Patent
Hirao

(10) Patent No.: US 7,305,138 B2
(45) Date of Patent: Dec. 4, 2007

(54) IMAGE ENCODING APPARATUS, IMAGE ENCODING METHOD AND PROGRAM

(75) Inventor: Koichiro Hirao, Shizuoka (JP)

(73) Assignee: NEC Corporation, Tokyo (JP)

( * ) Notice: Subject to any disclaimer, the term of this patent is extended or adjusted under 35 U.S.C. 154(b) by 927 days.

(21) Appl. No.: 10/619,679

(22) Filed: Jul. 14, 2003

(65) Prior Publication Data

US 2004/0013311 A1 Jan. 22, 2004

(30) Foreign Application Priority Data

Jul. 15, 2002 (JP) ............................... 2002-206217

(51) Int. Cl.
G06K 9/46 (2006.01)
(52) U.S. Cl. ...................................... 382/247; 341/107
(58) Field of Classification Search ................. 382/247
See application file for complete search history.

(56) References Cited

U.S. PATENT DOCUMENTS

| | | | | |
|---|---|---|---|---|
| 4,891,643 A | * | 1/1990 | Mitchell et al. | 341/107 |
| 4,905,297 A | * | 2/1990 | Langdon et al. | 382/247 |
| 4,935,882 A | * | 6/1990 | Pennebaker et al. | 702/181 |
| 5,059,976 A | * | 10/1991 | Ono et al. | 341/51 |
| 5,099,440 A | * | 3/1992 | Pennebaker et al. | 702/181 |
| 5,297,220 A | * | 3/1994 | Nomizu | 382/247 |
| 5,307,062 A | * | 4/1994 | Ono et al. | 341/107 |
| 5,311,177 A | * | 5/1994 | Kimura et al. | 341/51 |
| 5,363,099 A | * | 11/1994 | Allen | 341/107 |
| 5,422,734 A | * | 6/1995 | Kang | 382/238 |
| 5,694,128 A | * | 12/1997 | Kim | 341/79 |
| RE35,781 E | * | 5/1998 | Ono et al. | 341/51 |
| 5,784,497 A | * | 7/1998 | Ishizuka et al. | 382/247 |

(Continued)

FOREIGN PATENT DOCUMENTS

EP 998127 A2 * 5/2000

(Continued)

OTHER PUBLICATIONS

ISO/IEC JTC1/SC29 WG1, JPEG 2000 Editor Martin Boliek, Coeditors Charilaos Christopoulos, and Eric Majani, "JPEG 2000 Part I Final Committee Draft Version 1.0", Mar. 16, 2000.*

(Continued)

Primary Examiner—Matthew C. Bella
Assistant Examiner—Sath V. Perungavoor
(74) Attorney, Agent, or Firm—Katten Muchin Rosenman LLP

(57) ABSTRACT

An image encoding apparatus encodes an image signal according to a JPEG2000 standard. A wavelet converter in the image encoding apparatus acquires a plurality of conversion coefficients by performing wavelet conversion on the image signal. A modeling unit in the image encoding apparatus generates a plurality of symbols representing the plurality of conversion coefficients and a plurality of contexts by performing a modeling process on the plurality of conversion coefficients obtained by the wavelet converter. An arithmetic encoder in the image encoding apparatus discriminates whether each of the symbols is an MPS (More Probable Symbol) or LPS (Less Probable Symbol). In a case where it is discriminated that the symbol is an MPS, the arithmetic encoder executes CODEMPS. In a case where it is discriminated that the symbol is an LPS, the arithmetic encoder executes CODEMPS executes either CODEMPS or CODELPS according to a predetermined condition.

17 Claims, 11 Drawing Sheets

U.S. PATENT DOCUMENTS

| | | | |
|---|---|---|---|
| 5,812,076 A * | 9/1998 | Yoshida | 341/106 |
| 6,075,471 A * | 6/2000 | Kimura et al. | 341/107 |
| 6,091,854 A * | 7/2000 | Slattery et al. | 382/232 |
| 6,188,334 B1 * | 2/2001 | Bengio et al. | 341/51 |
| 6,225,925 B1 * | 5/2001 | Bengio et al. | 341/107 |
| 6,265,997 B1 * | 7/2001 | Nomizu | 341/107 |
| 6,351,569 B1 * | 2/2002 | Kimura et al. | 382/247 |
| 6,476,740 B1 * | 11/2002 | Bengio et al. | 341/107 |
| 6,489,903 B2 * | 12/2002 | Kimura et al. | 341/107 |
| 6,549,665 B1 * | 4/2003 | Hirao | 382/232 |
| 6,553,144 B1 * | 4/2003 | Hirao et al. | 382/239 |
| 6,850,175 B1 * | 2/2005 | Bossen | 341/107 |
| 2001/0006370 A1 * | 7/2001 | Bengio et al. | 341/107 |
| 2002/0006225 A1 * | 1/2002 | Kimura et al. | 382/200 |
| 2002/0014981 A1 * | 2/2002 | Bengio et al. | 341/107 |
| 2002/0021234 A1 * | 2/2002 | Yanagiya et al. | 341/107 |
| 2002/0107669 A1 | 8/2002 | Chen | |
| 2007/0019867 A1 * | 1/2007 | Kwon et al. | 382/232 |
| 2007/0139234 A1 * | 6/2007 | Chen | 341/51 |

FOREIGN PATENT DOCUMENTS

| | | |
|---|---|---|
| JP | 05-328136 | 12/1993 |
| JP | 11-055531 | 2/1999 |

OTHER PUBLICATIONS

Japanese Office Action dated Mar. 7, 2006 for corresponding Japanese Application 2002-206217.

* cited by examiner

IMAGE ENCODING APPARATUS, IMAGE ENCODING METHOD AND PROGRAM

BACKGROUND OF THE INVENTION

1. Field of the Invention

The present invention relates to an image encoding apparatus, an image encoding method and a program 2. Description of the Related Art One of schemes for encoding an image is JPEG (Joint Photographic Experts Group) based on the ISO/IEC 10918 Recommendation prepared by the ISO (International Organization for Standardization) and IEC (International Electrotechnical Commission).

JPEG can acquire a relatively high compressibility. JPEG however suffers significant degradation of image quality at a low bit rate.

JPEG2000 based on the ISO/IEC 15444 Recommendation is one scheme which ensure suppressed degradation of image quality even at a low bit rate.

At the same compressibility, the quality of an image compressed by JPEG2000 is higher than the quality of an image compressed by JPEG With the same image quality, the compressibility of JPEG2000 is higher than the compressibility JPEG Further, JPEG2000 can execute an encoding process through nearly the same procedures in both lossless encoding and lossy encoding.

In view of the aforementioned advantages, JPEG2000 is expected to become popular as an encoding system (compression system) for compressing image signals generated by a digital camera, an image scanner and so forth and an encoding system (compression system) for compressing image data to be distributed over the Internet.

But, a higher compressibility is needed to send high-quality image data at a high speed in narrow-band communication, such as wireless communication.

The contents of the ISO/IEC 15444 Recommendation are incorporated herein by reference.

SUMMARY OF THE INVENTION

Accordingly, it is an object of the invention to provide an image encoding apparatus, an image encoding method and a program for compressing images at a high compressibility.

To achieve the object, an image encoding apparatus according to the first aspect of the invention encodes an image signal according to a JPEG2000 standard, and comprises:

a wavelet converter which acquires a plurality of conversion coefficients by performing wavelet conversion on the image signal;

a modeling unit which generates a plurality of symbols representing the plurality of conversion coefficients and a plurality of contexts by performing a modeling process on the plurality of conversion coefficients obtained by the wavelet converter; and an arithmetic encoder which performs arithmetic encoding using the plurality of symbols and the plurality of contexts generated by the modeling unit, wherein the arithmetic encoder discriminates whether each of the symbols is an MPS (More Probable Symbol) or LPS (Less Probable Symbol), executes CODEMPS in a case where it is discriminated that the symbol is an MPS and executes either CODEMPS or CODELPS according to a predetermined condition in a case where it is discriminated that the symbol is an LPS.

This invention can compress images at a high compressibility.

In a case where it is discriminated that the symbol is an LPS, the arithmetic encoder may compare a probability of occurrence of an LPS corresponding to a current context with a predetermined threshold value, execute the CODEMPS in a case where the probability of occurrence is greater than the threshold value and execute the CODELPS in a case where the probability of occurrence is not greater than the threshold value.

In a case where the probability of occurrence is greater than the threshold value, the arithmetic encoder may change a value of the symbol and executes the CODEMPS.

The modeling unit may classify the plurality of conversion coefficients to a plurality of bit planes and classify the plurality of conversion coefficients to a plurality of encoding passes to thereby generate the plurality of symbols, the threshold value may be independently set for each of the plurality of encoding passes, and the arithmetic encoder may use different threshold values for the plurality of encoding passes respectively.

The wavelet converter may divide an image represented by the image signal into a plurality of sub bands, the threshold value may be independently set for each of the plurality of sub bands, and the arithmetic encoder may use different threshold values for the plurality of sub bands respectively.

That threshold value which is associated with a sub band LL in the plurality of sub bands may be set larger than those threshold values which are associated with the other sub bands and that threshold value which is associated with a sub band HH may be set smaller than those threshold values which are associated with the other sub bands.

The threshold value associated with the sub band LL may be set larger than a value the probability of occurrence can take.

In a case where it is discriminated that the symbol is an LPS, the arithmetic encoder may discriminate whether or not an encoding pass to be processed is a degrading pass to degrade an image quality as a result of execution of the CODEMPS in a case where the symbol is an LPS, execute the CODELPS in a case where it is discriminated that the encoding pass is the degrading pass, and compare the probability of occurrence with the threshold value in a case where it is discriminated that the encoding pass is not the degrading pass.

An image encoding method according to the second aspect of the invention encodes an image signal according to a JPEG2000 standard and comprises:

acquiring a plurality of conversion coefficients by performing wavelet conversion on the image signal;

generating a plurality of symbols representing the plurality of conversion coefficients and a plurality of contexts by performing a modeling process on the plurality of conversion coefficients obtained by the wavelet conversion; and performing arithmetic encoding using the plurality of symbols and the plurality of contexts generated by the modeling process, wherein the performing arithmetic encoding includes discriminating whether each of the symbols is an MPS (More Probable Symbol) or LPS (Less Probable Symbol), executing CODEMPS in a case where it is discriminated that the symbol is an MPS and executing either CODEMPS or CODELPS according to a predetermined condition in a case where it is discriminated that the symbol is an LPS.

The executing either CODEMPS or CODELPS may include:
comparing a probability of occurrence of an LPS corresponding to a current context with a predetermined threshold value;
executing the CODEMPS in a case where the probability of occurrence is greater than the threshold value; and
executing the CODELPS in a case where the probability of occurrence is not greater than the threshold value.

The executing either CODEMPS or CODELPS further may include changing a value of the symbol in a case where the probability of occurrence is greater than the threshold value.

The generating the plurality of symbols and the plurality of contexts may include classifying the plurality of conversion coefficients to a plurality of bit planes and classifying the plurality of conversion coefficients to a plurality of encoding passes to thereby generate the plurality of symbols,
the threshold value may be independently set for each of the plurality of encoding passes, and
the performing arithmetic encoding may include using different threshold values for the plurality of encoding passes respectively.

The acquiring the plurality of conversion coefficients may include dividing an image represented by the image signal into a plurality of sub bands by wavelet conversion,
the threshold value may be independently set for each of the plurality of sub bands, and
the performing arithmetic encoding may include using different threshold values for the plurality of sub bands respectively.

That threshold value which is associated with a sub band LL in the plurality of sub bands may be set larger than those threshold values which are associated with the other sub bands and that threshold value which is associated with a sub band HH may be set smaller than those threshold values which are associated with the other sub bands.

The threshold value associated with the sub band LL may be set larger than a value the probability of occurrence can take.

The performing arithmetic encoding may further include discriminating whether or not an encoding pass to be processed is a degrading pass to degrade an image quality as a result of execution of the CODEMPS in a case where the symbol is an LPS, in a case where it is discriminated that the symbol is an LPS, and executing the CODELPS in a case where it is discriminated that the encoding pass is the degrading pass, and
the comparing the probability of occurrence with the threshold value may include comparing the probability of occurrence with the threshold value in a case where it is discriminated that the encoding pass to be processed is not the degrading pass.

A program according to the third aspect of the invention allows a computer to function as an image encoding apparatus for encoding an image signal according to a JPEG2000 standard, which comprises:
a wavelet converter which acquires a plurality of conversion coefficients by performing wavelet conversion on the image signal;
a modeling unit which generates a plurality of symbols representing the plurality of conversion coefficients and a plurality of contexts by performing a modeling process on the plurality of conversion coefficients obtained by the wavelet converter; and
an arithmetic encoder which performs arithmetic encoding using the plurality of symbols and the plurality of contexts generated by the modeling unit,
wherein the arithmetic encoder discriminates whether each of the symbols is an MPS (More Probable Symbol) or LPS (Less Probable Symbol), executes CODEMPS in a case where it is discriminated that the symbol is an MPS and executes either CODEMPS or CODELPS according to a predetermined condition in a case where it is discriminated that the symbol is an LPS.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

An image encoding/decoding apparatus according to one embodiment of the invention will be described below with reference to the accompanying drawings.

The following description will be given of a case where the invention is adapted to an image encoding/decoding apparatus which performs encoding and decoding based on the JPEG2000 standard.

Figure 1:
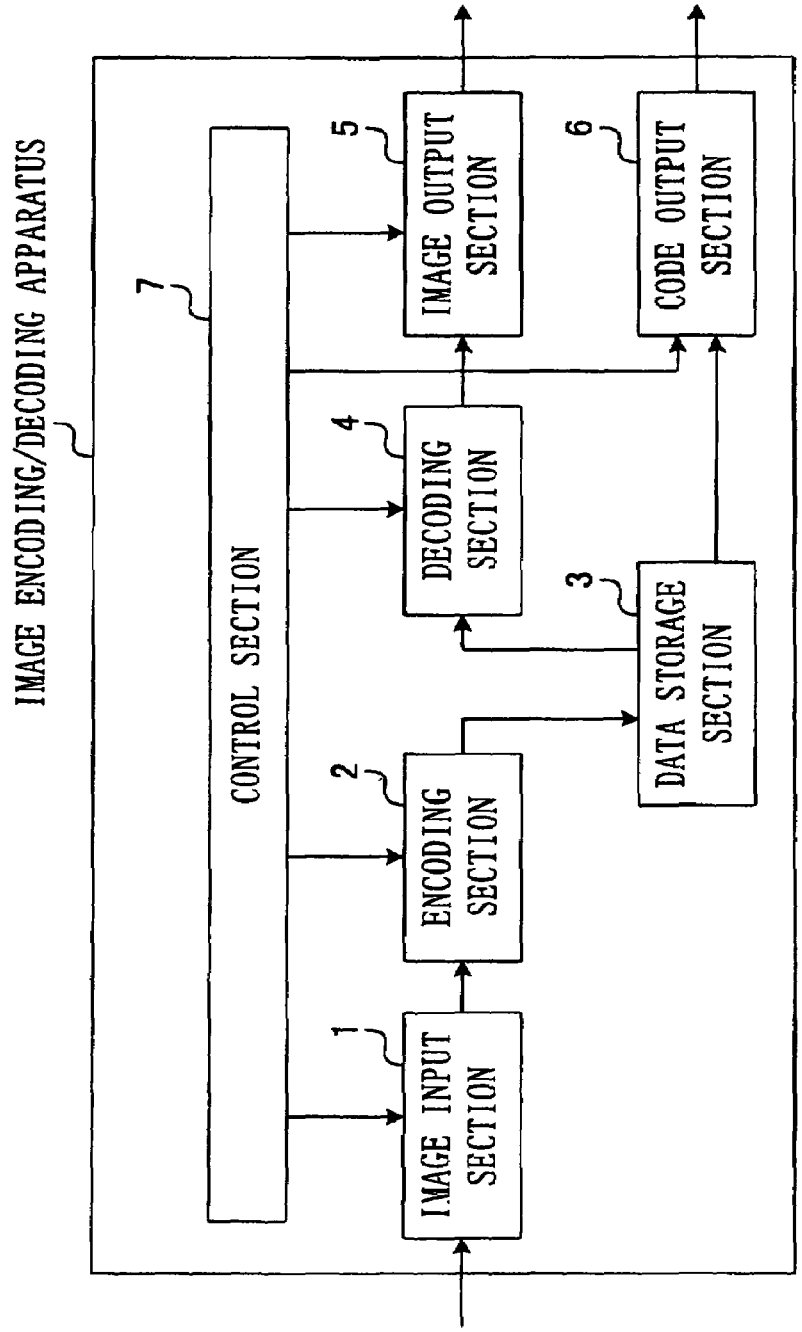
FIG. 1 is a structural diagram of an encoding/decoding apparatus according to one embodiment of the invention.

As shown in FIG. 1, the image encoding/decoding apparatus according to the embodiment of the invention comprises an image input section 1, an encoding section 2, a data storage section 3, a decoding section 4, an image output section 5, an code output section 6 and a control section 7.

The image input section 1 is connected to an external input unit, such as a digital camera, image scanner and/or a memory unit creating image signals. The image input section 1 inputs image signals, supplied from the connected input unit, to the encoding section 2 under the control of the control section 7.

The encoding section 2 encodes (compresses) input image signals based on the JPEG2000 standard under the control of the control section 7. The encoding section 2 stores image data obtained by encoding (compression) in the data storage section 3. The detailed structure of the encoding section 2 will be discussed later.

The data storage section 3 is comprised of a semiconductor memory and/or a hard disk or the like. The data storage section 3 stores image data generated by the encoding section 2.

The decoding section 4 reads predetermined image data from the data storage section 3 under the control of the control section 7. The decoding section 4 decodes (expands) the read image data based on the JPEG2000 standard under the control of the control section 7. This restores the original image signals. The decoding section 4 sends the restored image signal to the image output section 5.

The image output section 5 is connected to an external output unit, such as a printer and/or display. The image output section 5 sends image signals supplied from the decoding section 4 to the connected output unit under the control of the control section 7.

The code output section 6 is connected to a communication network, such as the Internet and/or telephone circuit network. The code output section 6 reads predetermined image data from the data storage section 3 under the control of the control section 7. The code output section 6 transmits the read image data to a predetermined terminal located at a remote place via the communication network under the control of the control section 7. The code output section 6 is connected to an external decoding unit which has a decoder to decode image data based on the JPEG2000 standard. The code output section 6 sends the image data read from the data storage section 3 to the connected decoding unit under the control of the control section 7.

The control section 7 is comprised of a CPU (Central Processing Unit). The control section 7 controls the operations of the individual sections that constitute the image encoding/decoding apparatus according to a program provided beforehand.

The detailed structure of the encoding section 2 will be discussed below.

The structure of the encoding section 2 described below may be realized by hardware such as an LSI (Large Scale Integrated circuit) or may be realized by a software program The structure of the encoding section 2 may also be realized by the combination of a software program and hardware In case where the encoding section 2 is realized by the combination of a software program and hardware (e.g., a coprocessor for image compression or the like), the coprocessor takes charge of, for example, a wavelet conversion process, quantization process and arithmetic encoding process which will be discussed later.

Figure 2:
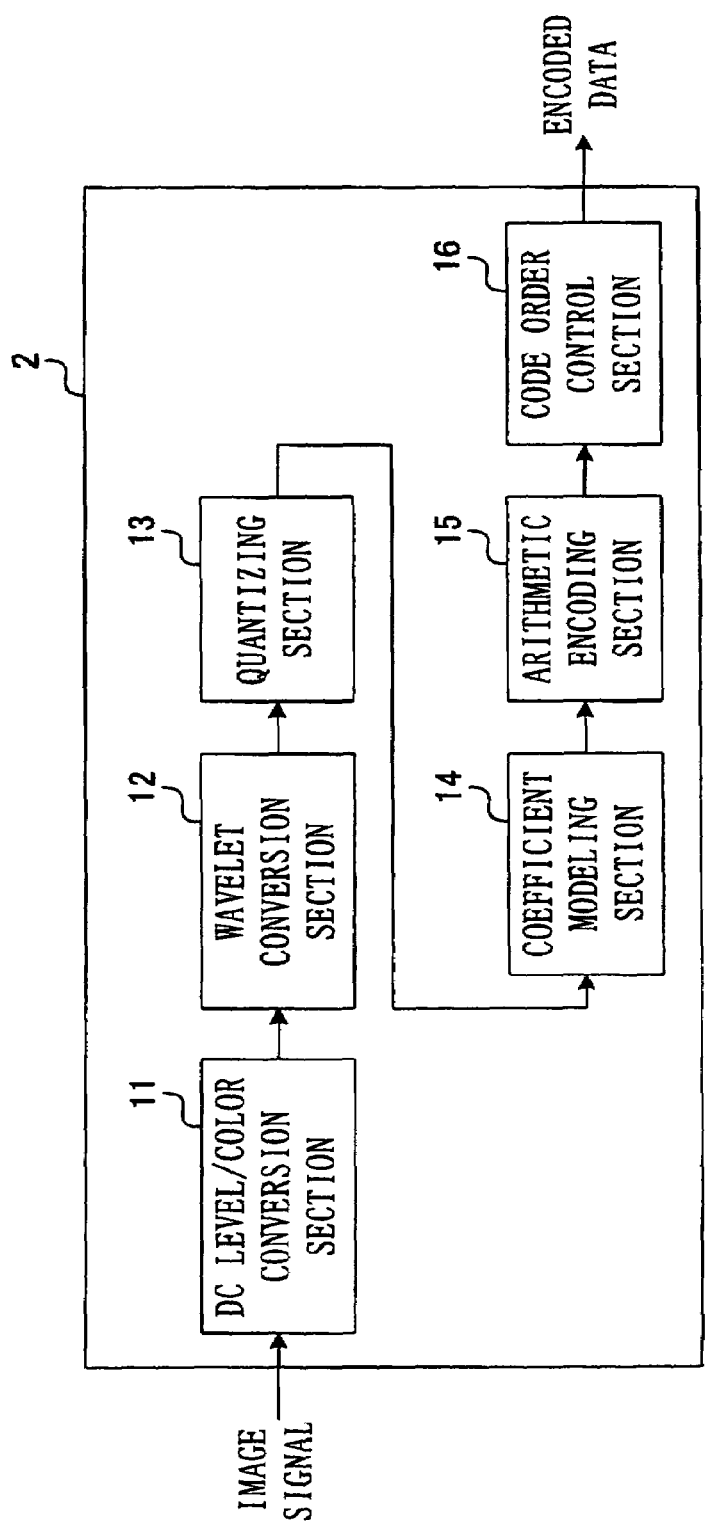
FIG. 2 is a diagram showing the structure of a JPEG2000 encoding section which constitutes the encoding/decoding apparatus in FIG. 1.

FIG. 2 is a structural diagram of the encoding section 2.

As shown in FIG. 2, the encoding section 2 comprises a DC level/color conversion section 11, a wavelet conversion section 12, a quantizing section 13, a coefficient modeling section 14, an arithmetic encoding section 15 and a code order control section 16.

The DC level/color conversion section 11 performs a level shifting process, color space conversion and tiling process on an image signal (RGB signal representing an image in red, green and blue) supplied from the image input section 1.

Specifically, the DC level/color conversion section 11 shifts the dynamic range of the supplied image signal by a half in the level shifting process. Through color space conversion, the DC level/color conversion section 11 converts the supplied image signal (RGB signal) to an image signal which represents an image with luminance (Y) and two color differences (Cb, Cr). The DC level/color conversion section 11 divides the image represented by the image signal into a plurality of areas in the tiling process.

The DC level/color conversion section 11 sends the image signal, which has undergone the level shifting process, color space conversion and tiling process, to the wavelet conversion section 12.

The wavelet conversion section 12 performs wavelet conversion on the image signal supplied from the DC level/color conversion section 11. As a result, the wavelet conversion section 12 acquires wavelet coefficients (conversion coefficients). The wavelet conversion section 12 sends the conversion coefficients, obtained through wavelet conversion, to the quantizing section 13.

The quantizing section 13 quantizes the conversion coefficients supplied from the wavelet conversion section 12. In case where the color space conversion by the DC level/color conversion section 11 and the wavelet conversion by the wavelet conversion section 12 are reversible, the quantization by the quantizing section 13 is omitted.

The coefficient modeling section 14 performs a modeling process on the conversion coefficients supplied from the quantizing section 13. Accordingly, the coefficient modeling section 14 generates symbols D and contexts CX to be used by the arithmetic encoding section 15 at the time of executing arithmetic encoding. The specific contents of the modeling process will be described later.

The arithmetic encoding section 15 performs arithmetic encoding (entropy encoding) using the symbols D and contexts CX generated by the coefficient modeling section 14. The specific procedures of the arithmetic encoding will be described later.

The code order control section 16 sorts data, acquired through the arithmetic encoding performed by the arithmetic encoding section 15, in accordance with a predetermined priority (layer, spatial resolution level, block position or color component). Accordingly, the code order control section 16 generates a bitstream. Further, the code order control section 16 adds header information to the generated bitstream. The code order control section 16 stores the header-information added bitstrearm in the data storage section 3.

The following will discuss the operation of the image encoding/decoding apparatus having the above-described structure.

It is to be noted that the operations of the individual sections, discussed below, which constitute the image encoding/decoding apparatus will be carried out under the control of the control section 7.

First, an image signal (RGB signal) representing an image is input to the image input section 1 from the external input unit connected to the image encoding/decoding apparatus.

The image input section 1 inputs the image signal, supplied from the input unit, to the encoding section 2.

The DC level/color conversion section 11 of the encoding section 2 performs the level shifting process on the supplied image signal. Accordingly, the DC level/color conversion section 11 shifts the dynamic range of the supplied image signal by a half;

Subsequently, the DC level/color conversion section 11 performs color space conversion on the supplied image signal. Accordingly, the DC level/color conversion section 11 converts the supplied RGB signal to an image signal which represents an image with luminance (Y) and color differences (Cb, Cr).

Further, the DC level/color conversion section 11 performs the tiling process on the image signal that has undergone the level shifting process and color space conversion. Accordingly, the DC level/color conversion section 11 divides the image represented by the image signal into a plurality of areas (tiles).

The DC level/color conversion section 11 sends the wavelet conversion section 12 the image signal that has undergone the level shifting process, color space conversion and tiling process.

The wavelet conversion section 12 performs wavelet conversion, tile by tile, using the supplied image signal.

Figure 3:
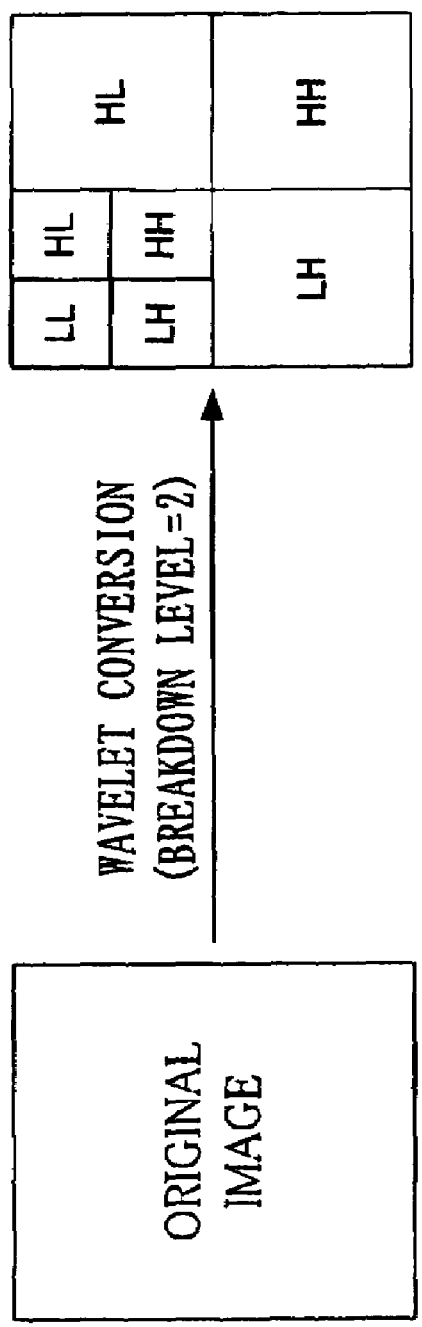
FIG. 3 is a diagram showing an example of wavelet conversion which is executed by a wavelet conversion section that constitutes the JPEG2000 encoding section in FIG. 2.

Specifically, the wavelet conversion section 12 performs low-pass filtering and high-pass filtering in both the vertical direction and horizontal direction of the image. As a result, the image is broken down to a plurality of sub bands. In case where the breakdown level is 2, for example, the image is broken up into seven sub bands as shown in FIG. 3. Then, the wavelet conversion section 12 sends the wavelet coefficients (conversion coefficients) of the individual sub bands to the quantizing section 13.

In FIG. 3, LL is a sub band obtained when low-pass filtering is performed in both the vertical direction and horizontal direction. HL is a sub band which is acquired when high-pass filtering is performed in the horizontal direction and low-pass filtering is performed in the vertical direction. LH is a sub band which is acquired when low-pass filtering is performed in the horizontal direction and high-pass filtering is performed in the vertical direction. HH is a sub band obtained when high-pass filtering is performed in both the vertical direction and horizontal direction. Of the images of those sub bands, the image of the sub band LL has an image quality closest to the image quality of the original image.

The quantizing section 13 quantizes the conversion coefficients supplied from the wavelet conversion section 12. Then, the quantizing section 13 sends the quantized conversion coefficients to the coefficient modeling section 14.

The coefficient modeling section 14 performs the modeling process on the conversion coefficients supplied from the quantizing section 13.

Figure 4:
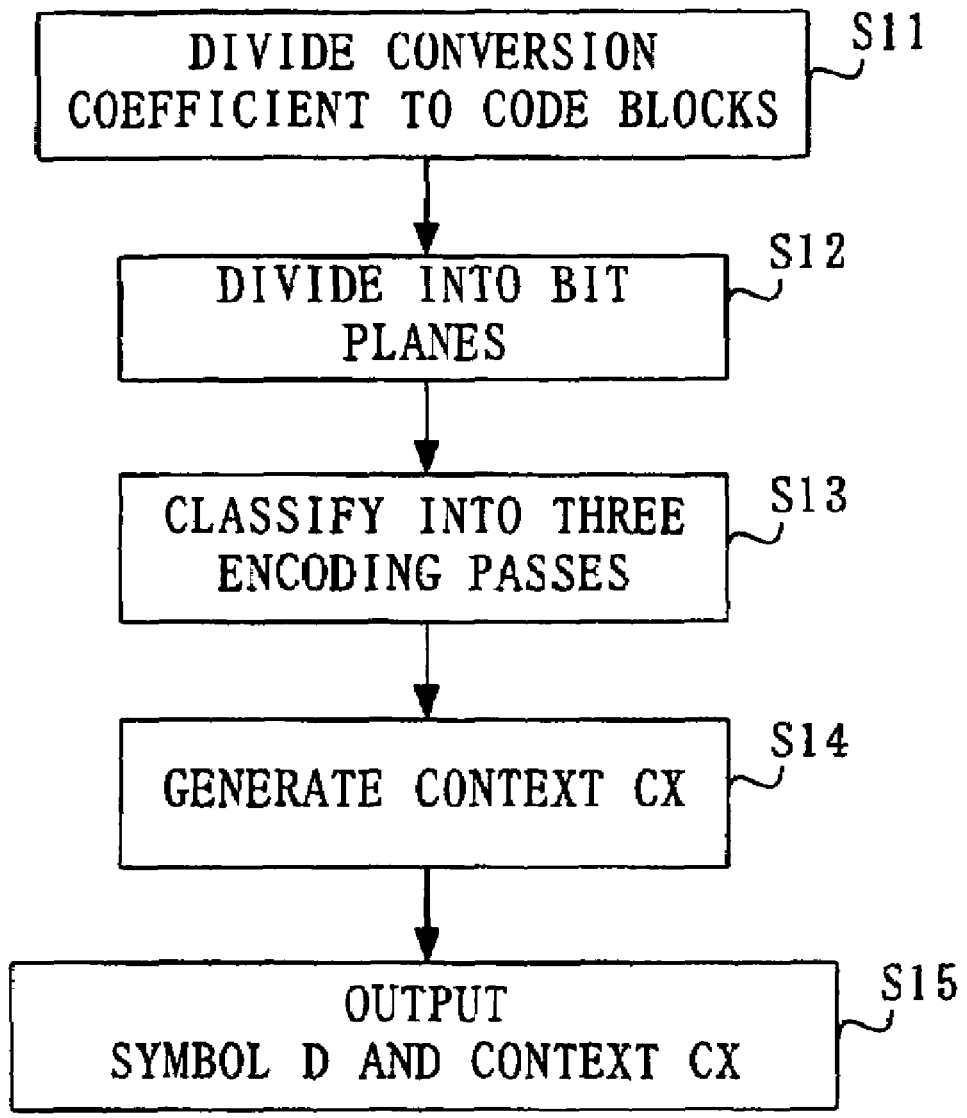
FIG. 4 is a diagram showing a modeling process which is executed by a coefficient modeling section that constitutes the JPEG2000 encoding section in FIG. 2.

Specifically, as shown in FIG. 4, the coefficient modeling section 14 divides each supplied conversion coefficient to code blocks of a predetermined size first (step S11).

Subsequently, the coefficient modeling section 14 divides each conversion coefficient in each code block into bit planes (step S12). The least significant bit plane includes the LSB (Least Significant Bit) of each conversion coefficient and the most significant bit plane includes the MSB (Most Significant Bit) of each conversion coefficient Then, the coefficient modeling section 14 classifies the individual conversion coefficients to three encoding passes for each bit plane while discriminating whether each conversion coefficient in each bit plane is significant or insignificant (step S13).

A "significant coefficient" is a conversion coefficient in whose upper bit plane "1" has occurred (i.e., a coefficient whose value is discriminated as being not "0"). An "insignificant coefficient" is a conversion coefficient in whose upper bit plane "1" has not occurred (i.e., a coefficient whose value is or may be "0").

The three encoding passes are Significance propagation pass, Magnitude refinement pass and Cleanup pass.

The Significance propagation pass includes insignificant conversion coefficients around which there are significant coefficients. The Magnitude refinement pass includes significant conversion coefficients. The Cleanup pass includes the remaining conversion coefficients that are not included in both the Significance propagation pass and Magnitude refinement pass.

Through the classification, each conversion coefficient is represented by symbols D of "0" or "1".

The coefficient modeling section 14 generates contexts CX representing the statistic property of each conversion coefficient based on the significance/insignificance of conversion coefficients around that conversion coefficient (step S14).

The coefficient modeling section 14 sends the symbols D and contexts CX, obtained in the modeling, to the arithmetic encoding section 15 for each encoding pass (step S15).

The arithmetic encoding section 15 executes arithmetic encoding for each encoding pass using the symbols D and contexts CX supplied from the coefficient modeling section 14. The arithmetic encoding that is executed by the arithmetic encoding section 15 uses a binary encoding algorithm called MQ encoding.

Figure 5A:
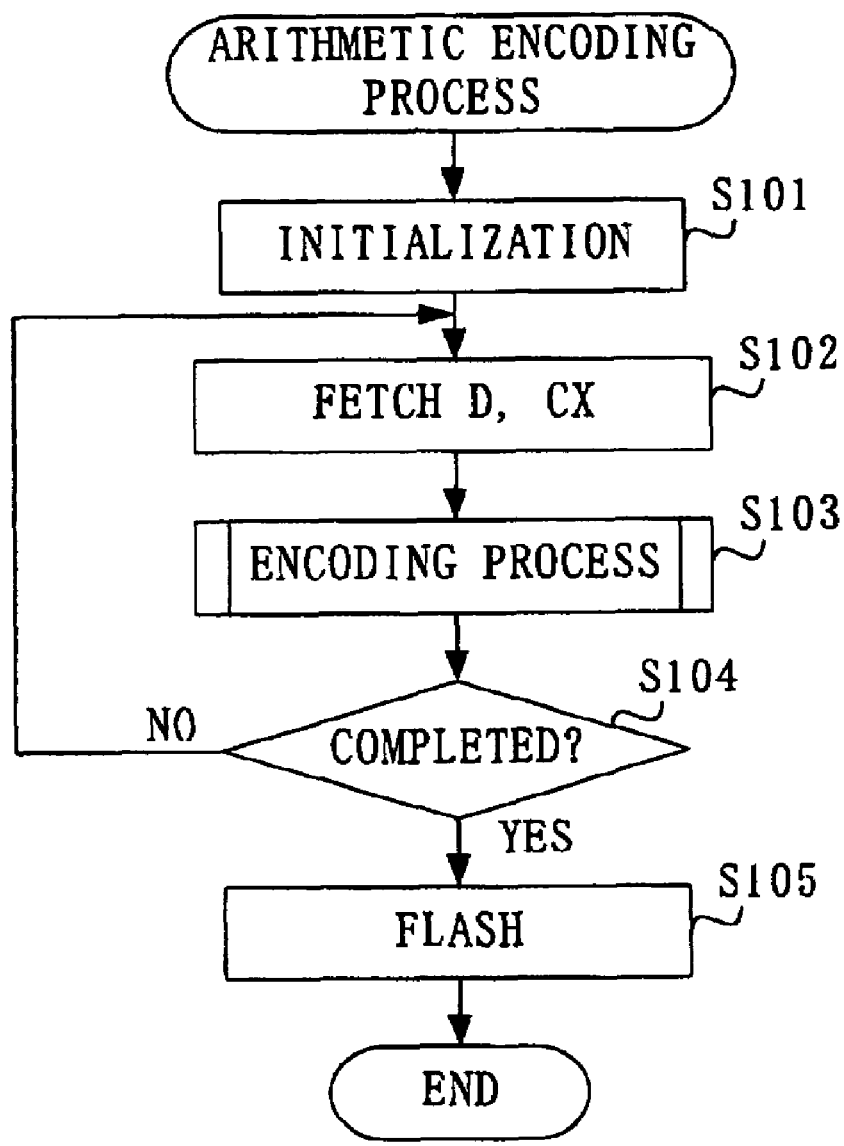
FIG. 5A is a flowchart illustrating an arithmetic encoding process which is executed by an arithmetic encoding section that constitutes the JPEG2000 encoding section in FIG. 2.

Specifically, as shown in FIG. 5A, the arithmetic encoding section 15 first initializes parameters to be used in arithmetic encoding (step S101).

Next, the arithmetic encoding section 15 fetches the symbols D and contexts CX supplied (step S102).

Then, the arithmetic encoding section 15 executes an encoding process using the fetched symbols D and contexts CX (step S103).

The detailed contents of the encoding process that is executed in step S103 will be described later.

Thereafter, the arithmetic encoding section 15 determines whether coding in the encoding pass to be processed has been completed or not. Accordingly, the arithmetic encoding section 15 discriminates whether the arithmetic encoding process for the encoding pass to be processed is to be terminated or not (step S104).

In a case where it is not discriminated that coding in the encoding pass to he processed has been completed (NO in step Sl04), the arithmetic encoding section 15 returns to the process of the step S102.

In a case where it is discriminated that coding in the encoding pass to be pressed has been completed (YES in step S104), the arithmetic encoding section 15 performs a flash process to flash out data obtained in the arithmetic encoding (step S105) and terminates the arithmetic encoding process for a single encoding pass.

The arithmetic encoding section 15 performs the above-described processes for each encoding pass.

The code order control section 16 generates a bitstream by sorting data, acquired through the arithmetic encoding.

Then, the code order control section 16 adds header information to the generated bitstream and stores the resultant bitstream in the data storage section 3.

The bitstream stored in the data storage section 3 is decoded (expanded) by the decoding section 4 and is then supplied to the external output unit by the image output section 5. Alternatively, the bitstream is supplied to an external terminal or an external decoding unit by the code output section 6.

A description will now be given of the encoding process that is carried out in step S103 by the arithmetic encoding section 15.

Figure 5B:
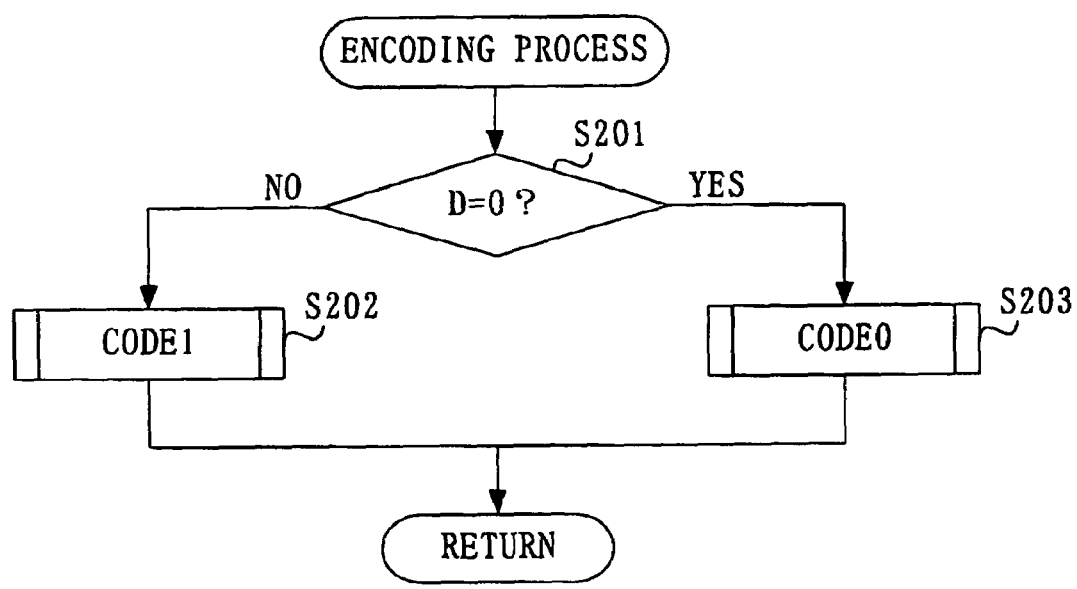
FIG. 5B is a flowchart illustrating an encoding process that constitutes the arithmetic encoding process in FIG. 5A.

As shown in FIG. 5B, the arithmetic encoding section 15 discriminates whether the value of the fetched symbol D is "0" or not (step S201).

In a case where it is discriminated that the symbol D is not "0", i.e., that the symbol D is "1" (NO in step S201), the arithmetic encoding section 15 executes a process "CODE1" based on the ISO/IEC 15444 Recommendation (step S202).

In a case where it is discriminated that the symbol D is "0" (YES in step S201), on the other hand, the arithmetic encoding section 15 executes a process "CODE0" based on the ISO/IEC 15444 Recommendation (step S203).

Figure 6A:
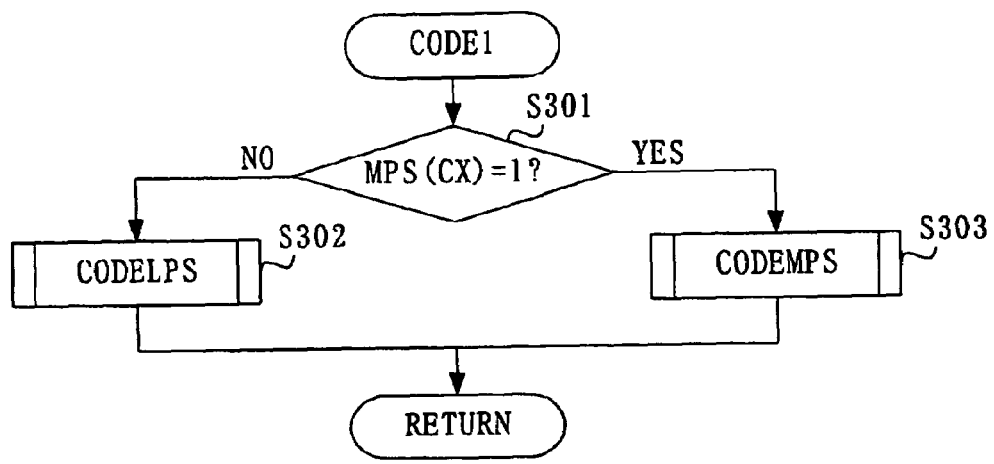
FIGS. 6A and 6B are flowcharts illustrating a CODE1 process and CODE0 process that constitute the encoding process in FIG. 5B and are executed when the invention is not adapted.
Figure 6B:
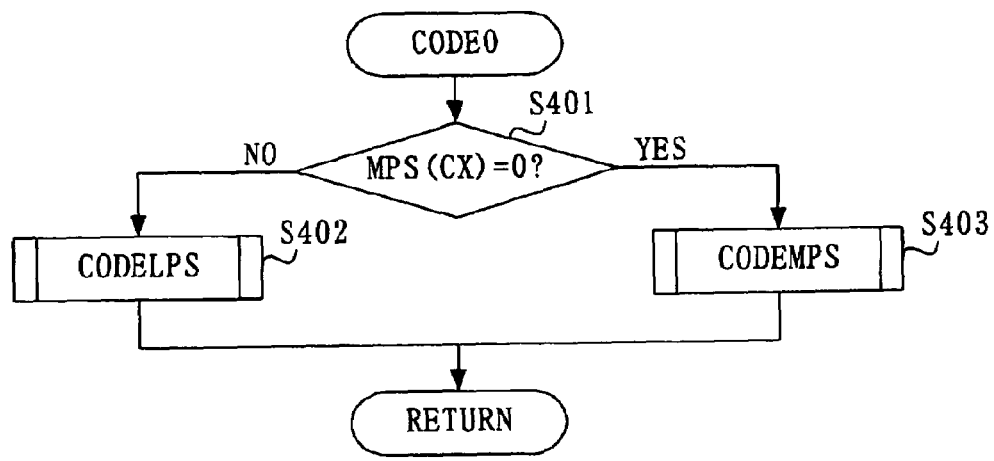
Figure 7A:
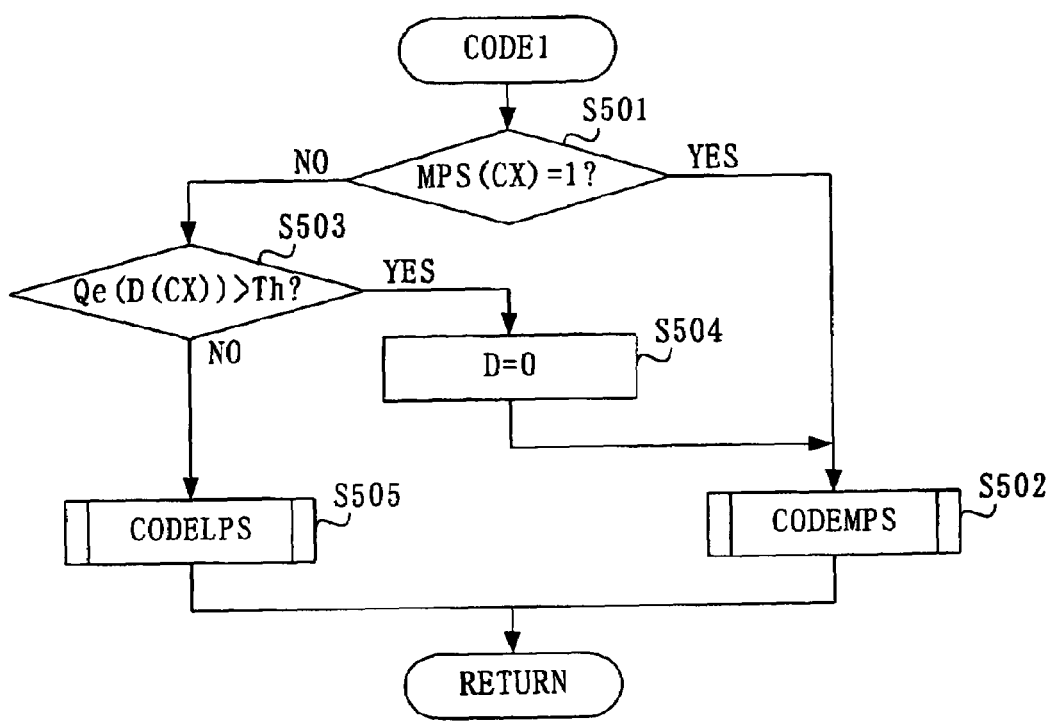
FIG. 7A is a flowchart illustrating a CODE1 process that constitutes the encoding process in FIG. 5B and is executed when the invention is adapted.
Figure 7B:
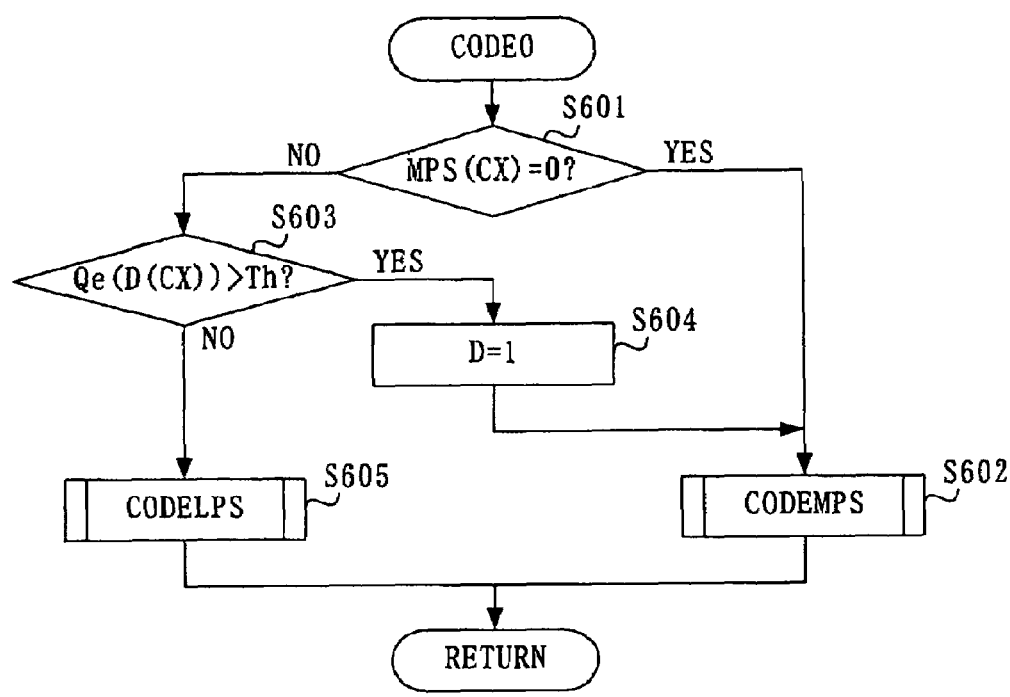
FIG. 7B is a flowchart illustrating a CODE0 process that constitutes the encoding process in FIG. 5B and is executed when the invention is adapted.

FIG. 6A is a flowchart illustrating the CODE1 that is performed normally in the step S202, and FIG. 6B is a flowchart illustrating the CODE0 that is performed normally in the step S203. FIG. 7A is a flowchart illustrating the CODE1 that is executed in the step S202 when the invention is adapted, and FIG. 7B is a flowchart illustrating the CODE0 that is executed in the step S203 when the invention is adapted.

First, the CODE1 and CODE0 that are carried out normally will be discussed.

In the CODE1, as shown in FIG. 6A, the arithmetic encoding section 15 discriminates whether the fetched symbol D is an MPS (More Probable Symbol) or LPS (Less Probable Symbol). Specifically, the arithmetic encoding section 15 discriminates whether an MPS identifying flag MPS (CX) corresponding to the current context CX is "1" or not (step S301).

In a case where it is discriminated that the MPS(CX) is not "1", i.e., that the symbol D is an LPS (NO in step S301), the arithmetic encoding section 15 executes a process "CODELPS" based on the ISO/IEC 15444 Recommendation (step S302).

In a case where it is discriminated that the MPS(CX) is "1", i.e., that the symbol D is an MPS (YES in step S301), on the other hand, the arithmetic encoding section 15 executes a process "CODEMPS" based on the ISO/IEC 15444 Recommendation (step S303).

As apparent from the above, the CODELPS is carried out in a case where the MPS(CX) is not "1", i.e., prediction has failed and the CODEMPS is carried out in a case where the MPS(CX) is "1", i.e., prediction has been met In the CODE0, as shown in FIG. 6B, the arithmetic encoding section 15 discriminates whether the fetched symbol D is an MPS or LPS. Specifically, the arithmetic encoding section 15 discriminates whether an MPS identifying flag MPS (CX) corresponding to the current context CX is "0" or not (step S401).

In a case where it is discriminated that the MPS(CX) is not "0", i.e., that the symbol D is an LPS (NO in step S401), the arithmetic encoding section 15 executes the CODELPS (step S402).

In a case where it is discriminated that the MPS(CX) is "0", i.e., that the symbol D is an MPS (YES in step S401), on the other hand, the arithmetic encoding section 15 executes the CODEMPS (step S403).

As apparent from the above, the CODELPS is carried out in a case where the MPS(CX) is not "0", i.e., prediction has failed and the CODEMPS is carried out in a case where the MPS(CX) is "0", i.e., prediction has been met.

In other words, in the normal process, the CODEMPS is always carried out when prediction is met and the CODELPS is always carried out when prediction has failed.

In case where the invention is adapted, the CODEMPS is executed when a predetermined condition is satisfied as shown in FIGS. 7A and 7B even when prediction has failed In the CODE1, as shown in FIG. 7A, the arithmetic encoding section 15 discriminates whether the fetched symbol D is an MPS or LPS. Specifically, the arithmetic encoding section 15 discriminates whether an MPS identifying flag MPS (CX) corresponding to the current context CX is "1" or not (step S501).

In a case where it is discriminated that the MPS(CX) is "1", i.e., that the symbol D is an MPS (YES in step S501), the arithmetic encoding section 15 executes the CODEMPS (step S502).

In a case where it is discriminated that the MPS(CX) is not "1", i.e., that the symbol D is an LPS (NO in step S501), the arithmetic encoding section 15 compares the probability that prediction will fail, i.e., the probability of occurrence, Qe, of an LPS with respect to the current context CX with a predetermined threshold value Th. Specifically, the arithmetic encoding section 15 discriminates whether or not the probability of occurrence Qe is greater than the threshold value Th (step S503).

In the MQ encoding, the arithmetic encoding section 15 is provided with a probability prediction table where multiple probabilities of occurrence Qe are stored. The arithmetic encoding section 15 selects a probability of occurrence Qe corresponding to the current context CX from the given probability prediction table and uses it in comparison with the threshold value Th. The threshold value Th is preset based on theoretical calculation, experiments and so forth in accordance with the required image quality and compressibility. For example, the threshold value Th is set in such a way that the threshold value Th is smaller than the maximum one of the probabilities of occurrence Qe stored in the probability prediction table and lies within the range over which the required image quality and compressibility can be realized even if the CODEMPS is performed when prediction has failed. For example, the threshold value Th is set to 0.5. The probability of occurrence Qe being 0.5 means that the probability of occurrence of an MPS is equal to the probability of occurrence of an LPS, i.e., the probability of that prediction will be met is equal to the probability of that prediction will fail.

In a case where it is discriminated in the step S503 that the probability of occurrence Qe is greater than the threshold value Th (YES in step S503), the arithmetic encoding section 15 changes the symbol D to "0" from "1" (step S504). Then, the arithmetic encoding section 15 executes the CODEMPS in step S502.

In a case where it is not discriminated in the step S503 that the probability of occurrence Qe is greater than the threshold value Th (NO in step S503), the arithmetic encoding section 15 carries out the CODELPS (step S505).

In the CODE0, as shown in FIG. 7B, the arithmetic encoding section 15 discriminates whether the fetched symbol D is an MPS or LPS. Specifically, the arithmetic encoding section 15 discriminates whether an MPS identifying flag MPS (CX) corresponding to the current context CX is "0" or not (step S601).

In a case where it is discriminated that the MPS(CX) is "0", i.e., that the symbol D is an MPS (YES in step S601), the arithmetic encoding section 15 executes the CODEMPS (step S602).

In a case where it is discriminated that the MPS(CX) is not "0", i.e., that the symbol D is an LPS (NO in step S601), the arithmetic encoding section 15 compares the probability that prediction will fail, i.e., the probability of occurrence, Qe, of an LPS with respect to the current context CX with a predetermined threshold value Th. Specifically, the arithmetic encoding section 15 discriminates whether or not the probability of occurrence Qe is greater than the threshold value Th (step S603).

In a case where it is discriminated in the step S603 that the probability of occurrence Qc is greater than the threshold value Th (YES in step S603), the arithmetic encoding section 15 changes the symbol D to "1" from "0" (step S604). Then, the arithmetic encoding section 15 executes the CODEMPS in step S602.

In a case where it is not discriminated in the step S603 that the probability of occurrence Qe is greater than the threshold value Th (NO in step S603), the arithmetic encoding section 15 carries out the CODELPS (step S605).

With the invention adapted, as apparent from the above, in case where the probability of occurrence Qe of an LPS is greater than the threshold value Th even when prediction has failed, i.e., in case where executing the CODEMPS does not affect the image quality significantly, the CODEMPS is executed. Accordingly, the number of times renormalization is performed is less than the one in the normal case (FIGS. 6A and 6B). This can result in a higher compressibility than is obtained in the normal case (FIGS. 6A and 6B).

In case where the range of the threshold value Th that can ensure the required image quality and compressibility differs from one of the three encoding passes to another, different threshold values Th may be set for the three encoding passes respectively. Then, the arithmetic encoding section 15 may execute the CODE1 and CODE0 using the threshold values Th respectively set for the three encoding passes.

The degree of degradation of the image quality that occurs by execution of the CODEMPS when the symbol D is an LPS is the greatest for the sub band LL and the smallest for the sub band HH. Therefore, the threshold value Th for the sub band LL may be set larger than the threshold values Th for the other sub bands, and the threshold value Th for the sub band HH may be set smaller than the threshold values Th for the other sub bands. Alternatively, the threshold value Th for the sub band LL may be set larger than the value that the probability of occurrence Qe can take and the CODELPS may always be executed for the sub band LL when the symbol D is an LPS.

The CODELPS may always be carried for a predetermined number of bit planes from the lowest one of the bit planes that are generated by the coefficient modeling section 14. The number of bit planes for which the CODELPS is always executed when the symbol D is an LPS is determined based on theoretical calculation, experiments and so forth in accordance with the required image quality and compressibility.

In case where there is an encoding pass (degrading pass) for which the image quality is significantly degraded by the execution of the CODEMPS when the symbol D is an LPS, the arithmetic encoding section 15 may discriminate for each encoding pass whether or not comparison of the probability of occurrence Qe with the threshold value Th should be carried out when the symbol D is an LPS.

For example, when the Significance propagation pass and Magnitude refinement pass in the aforementioned three encoding passes are degrading passes, execution of the CODEMPS may be inhibited for the Significance propagation pass and Magnitude refinement pass when the symbol D is an LPS.

Figure 8A:
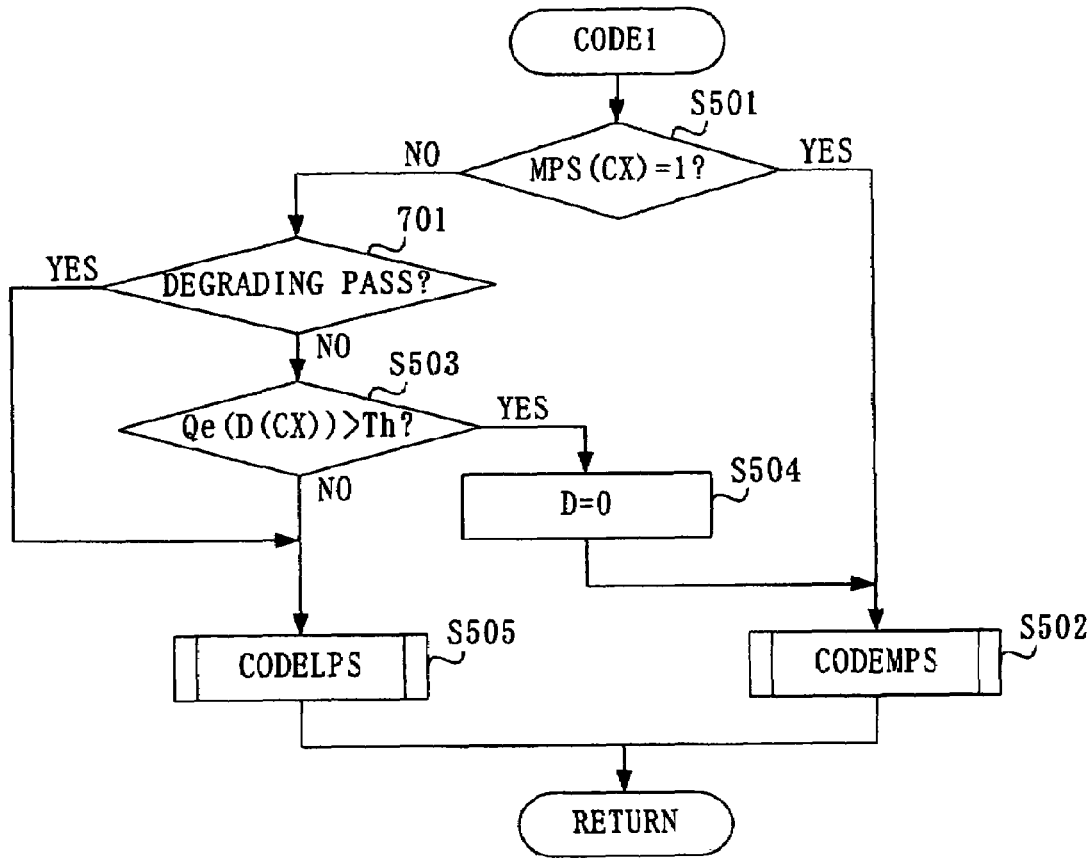
FIG. 8A is a flowchart illustrating another example of the CODE1 process shown in FIG. 7A.
Figure 8B:
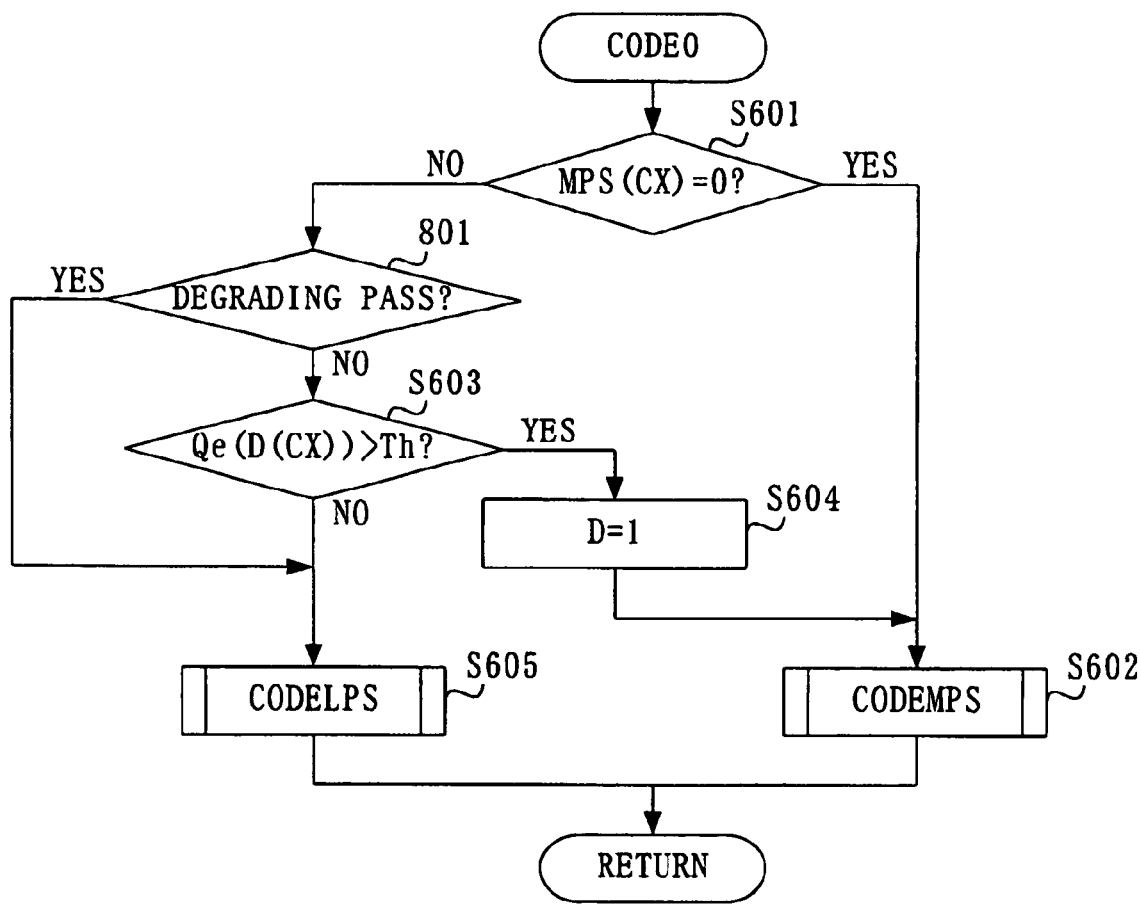
FIG. 8B is a flowchart illustrating another example of the CODE0 process shown in FIG. 7B.

In this case, as shown in FIGS. 8A and 8B, the arithmetic encoding section 15 may discriminate, between step S501 and step S503 shown in FIG. 7A and between step S601 and step S603 shown in FIG. 7B, whether or not the encoding pass to be processed is a degrading pass (step S701, S801).

In a case where it is discriminated that the target pass is a degrading pass (YES in step S701, S801), the arithmetic encoding section 15 may execute the CODELPS (step S505, S605). In a case where it is discriminated that the target pass is not a degrading pass (NO in step S701, S801), the arithmetic encoding section 15 may discriminate whether the probability of occurrence Qe is larger than the threshold value Th (step S503, S603).

The foregoing description of the embodiment has been given of an image encoding/decoding apparatus taken as an example. The invention can however be adapted to an application program or the like which is installed in a computer to perform encoding/decoding of image signals.

The illustrated image encoding/decoding apparatus of the embodiment does not request a process different from a normal process to the decoding unit (decoder) which decodes image data based on the JPEG2000 standard In other words, the decoding unit (decoder) can decode image data, acquired through encoding (compression) performed by the above-described image encoding/decoding apparatus, in accordance with the ISO/IEC 15444 Recommendation.

The apparatus of the present invention can be realized by a general computer, without the need for a dedicated apparatus. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the apparatus of the present invention. The above program and data may be stored in a disk device or the like included in the server device on the Internet, and embedded in a carrier wave. The program and data embedded in the carrier wave may be downloaded into the computer so as to realize the apparatus of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-206217 filed on Jul. 15, 2002, and including specification, claims, drawings and summary. The disclosure of the above Japanese Patent Application is incorporated herein by reference in its entirety.

What is claimed is:

1. An image encoding apparatus for encoding an image signal according to a JPEG2000 standard, comprising:
    a wavelet converter which acquires a plurality of conversion coefficients by performing wavelet conversion on said image signal;
    a modeling unit which generates a plurality of symbols representing said plurality of conversion coefficients and a plurality of contexts by performing a modeling process on said plurality of conversion coefficients obtained by said wavelet converter; and
    an arithmetic encoder which performs arithmetic encoding using said plurality of symbols and said plurality of contexts generated by said modeling unit,
    wherein said arithmetic encoder discriminates whether each of said symbols is an MPS (More Probable Symbol) or LPS (Less Probable Symbol), executes CODEMPS in a case where it is discriminated that said symbol is an MPS and executes either CODEMPS or CODELPS according to a predetermined condition in a case where it is discriminated that said symbol is an LPS, and wherein the predetermined condition is based on a probability of occurrence of an LPS corresponding to a current context.

2. An image encoding apparatus for encoding an image signal according to a JPEG2000 standard, comprising:

a wavelet converter which acquires a plurality of conversion coefficients by performing wavelet conversion on said image signal:

a modeling unit which generates a plurality of symbols representing said plurality of conversion coefficients and a plurality of contexts by performing a modeling process on said plurality of conversion coefficients obtained by said wavelet converter; and an arithmetic encoder which performs arithmetic encoding said plurality of symbols and said plurality of contexts generated by said modeling unit, wherein said arithmetic encoder discriminates whether each of said symbols is an MPS (More Probable Symbol) or LPS (Less Probable Symbol), executes CODEMPS in a case where it is discriminated that said symbol is an MPS and executes either CODEMPS or CODELPS according to a predetermined condition in a case where it is discriminated that said symbol is an LPS, and wherein in a case where it is discriminated that said symbol is an LPS, said arithmetic encoder compares a probability of occurrence of an LPS corresponding to a current context with a predetermined threshold value, executes said CODEMPS in a case where said probability of occurrence is greater than said threshold value and executes said CODELPS in a case where said probability of occurrence is not greater than said threshold value.

3. The image encoding apparatus according to claim 2, wherein in a case where said probability of occurrence is greater than said threshold value, said arithmetic encoder changes a value of said symbol and executes said CODEMPS.

4. The image encoding apparatus according to claim 3, wherein said modeling unit classifies said plurality of conversion coefficients to a plurality of bit planes and classifies said plurality of conversion coefficients to a plurality of encoding passes to thereby generate said plurality of symbols, said threshold value is independently set for each of said plurality of encoding passes, and said arithmetic encoder uses different threshold values for said plurality of encoding passes respectively.

5. The image encoding apparatus according to claim 3, wherein:

said wavelet convener divides an image represented by said image signal into a plurality of sub bands by wavelet conversion, said threshold value is independently set for each of said plurality of sub bands, and said arithmetic encoder uses different threshold values for said plurality of sub bands respectively.

6. The image encoding apparatus according to claim 5, wherein that threshold value which is associated with a sub band LL in said plurality of sub bands is set larger than those threshold values which are associated with the other sub bands and that threshold value which is associated with a sub band HH is set smaller than those threshold values which are associated with the other sub bands.

7. The image encoding apparatus according to claim 6, wherein said threshold value associated with said sub band LL is set larger than a value said probability of occurrence can take.

8. The image encoding apparatus according to claim 3, wherein in a case where it is discriminated that said symbol is an LPS, said arithmetic encoder discriminates whether or not an encoding pass to be processed is a degrading pass to degrade an image quality as a result of execution of said CODEMPS in a case where said symbol is an LPS, executes said CODELPS in a case where it is discriminated that said encoding pass is said degrading pass, and compares said probability of occurrence with said threshold value in a case where it is discriminated that said encoding pass is not said degrading pass.

9. An image encoding method of encoding an image signal according to a JPEG2000 standard, comprising:

acquiring a plurality of conversion coefficients by performing wavelet conversion on said image signal;

generating a plurality of symbols representing said plurality of conversion coefficients and a plurality of contexts by performing a modeling process on said plurality of conversion coefficients obtained by said wavelet conversion; and performing arithmetic encoding using said plurality of symbols and said plurality of contexts generated by said modeling process, wherein said performing arithmetic encoding includes discriminating whether each of said symbols is an MPS (More Probable Symbol) or LPS (Less Probable Symbol), executing CODEMPS in a case where it is discriminated that said symbol is an MPS and executing either CODEMPS or CODELPS according to a predetermined condition in a case where it is discriminated that said symbol is an LPS, and wherein the predetermined condition is based on a probability of occurrence of an LPS corresponding to a current context.

10. An image encoding method of encoding an image signal according to a JPEG2000 standard, comprising:

acquiring a plurality of conversion coefficients by performing wavelet conversion on said image signal;

generating a plurality of symbols representing said plurality of conversion coefficients and a plurality of contexts by performing a modeling process on said plurality of conversion coefficients obtained by said wavelet conversion; and performing arithmetic encoding using said plurality of symbols and said plurality of contexts generated by said modeling process, wherein said performing arithmetic encoding includes discriminating whether each of said symbols is an MPS (More Probable Symbol) or LPS (Less Probable Symbol), executing CODEMPS in a case Where it is discriminated that said symbol is an MPS and executing either CODEMPS or CODELPS according to a predetermined condition in a case where it is discriminated that said symbol is an LPS, and wherein said executing either CODEMPS or CODELPS includes:

comparing a probability of occurrence of an LPS corresponding to a current context with a predetermined threshold value;

executing said CODEMPS in a case where said probability of occurrence is greater than said threshold value; and executing said CODELPS in a case where said probability of occurrence is not greater than said threshold value.

11. The image encoding method according to claim 10, wherein said executing either CODEMPS or CODELPS further includes changing a value of said symbol in a case where said probability of occurrence is greater than said threshold value.

12. The image encoding method according to claim 11, wherein:

said generating said plurality of symbols and said plurality of contexts includes classifying said plurality of conversion coefficients to a plurality of bit planes and classifying said plurality of conversion coefficients to a plurality of encoding passes to thereby generate said plurality of symbols, said threshold value is independently set for each of said plurality of encoding passes, and said performing arithmetic encoding includes using different threshold values for said plurality of encoding passes respectively.

13. The image encoding method according to claim 11, wherein said acquiring said plurality of conversion coefficients includes dividing an image represented by said image signal into a plurality of sub bands by wavelet conversion, said threshold value is independently set for each of said plurality of sub bands, and said performing arithmetic encoding includes using different threshold values for said plurality of sub bands respectively.

14. The image encoding method according to claim 13, wherein that threshold value which is associated with a sub band LL in said plurality of sub bands is set, large than those threshold values which are associated with the other sub bands and that threshold value which is associated with a sub band HH is set smaller than those threshold values which are associated with the other sub bands.

15. The image encoding method according to claim 14, wherein said threshold value associated with said sub band LL is set larger than a value said probability of occurrence can take.

16. The image encoding method according to claim 11, wherein:

said performing arithmetic encoding further includes discriminating whether or not an encoding pass to be processed is a degrading pass to degrade an image quality as a result of execution of said CODEMPS in a case where said symbol is an LPS, in a case where it is discriminated that said symbol is an LPS, and executing said CODELPS in a case where it is discriminated that said encoding pass is said degrading pass, and said comparing said probability of occurrence with said threshold value includes comparing said probability of occurrence with said threshold value in a case where it is discriminated that said encoding pass to be processed is not said degrading pass.

17. A computer-readable medium storing a program for allowing a computer to function as an image encoding apparatus for encoding an image signal according to a JPEG2000 standard, which comprises:

a wavelet convener which acquires a plurality of conversion coefficients by performing wavelet conversion on said image signal;

a modeling unit which generates a plurality of symbols representing said plurality of conversion coefficients and a plurality of contexts by performing a modeling process on said plurality of conversion coefficients obtained by said wavelet converter; and an arithmetic encoder which performs arithmetic encoding using said plurality of symbols and said plurality of contexts generated by said modeling unit, wherein said arithmetic encoder discriminates whether each of said symbols is an MPS (More Probable Symbol) or LPS (Less Probable Symbol), executes CODEMPS in a case where it is discriminated that said symbol is an MPS and executes either CODEMPS or CODELPS according to a predetermined condition in a case where it is discriminated that said symbol is an LPS, and wherein the predetermined condition is based on a probability of occurrence of an LPS corresponding to a current context.

* * * * *